Jan. 12, 1932. M. KATZMAN 1,841,290
VEHICLE SEAT AND TOP CONSTRUCTION
Filed Aug. 31, 1928 3 Sheets-Sheet 1
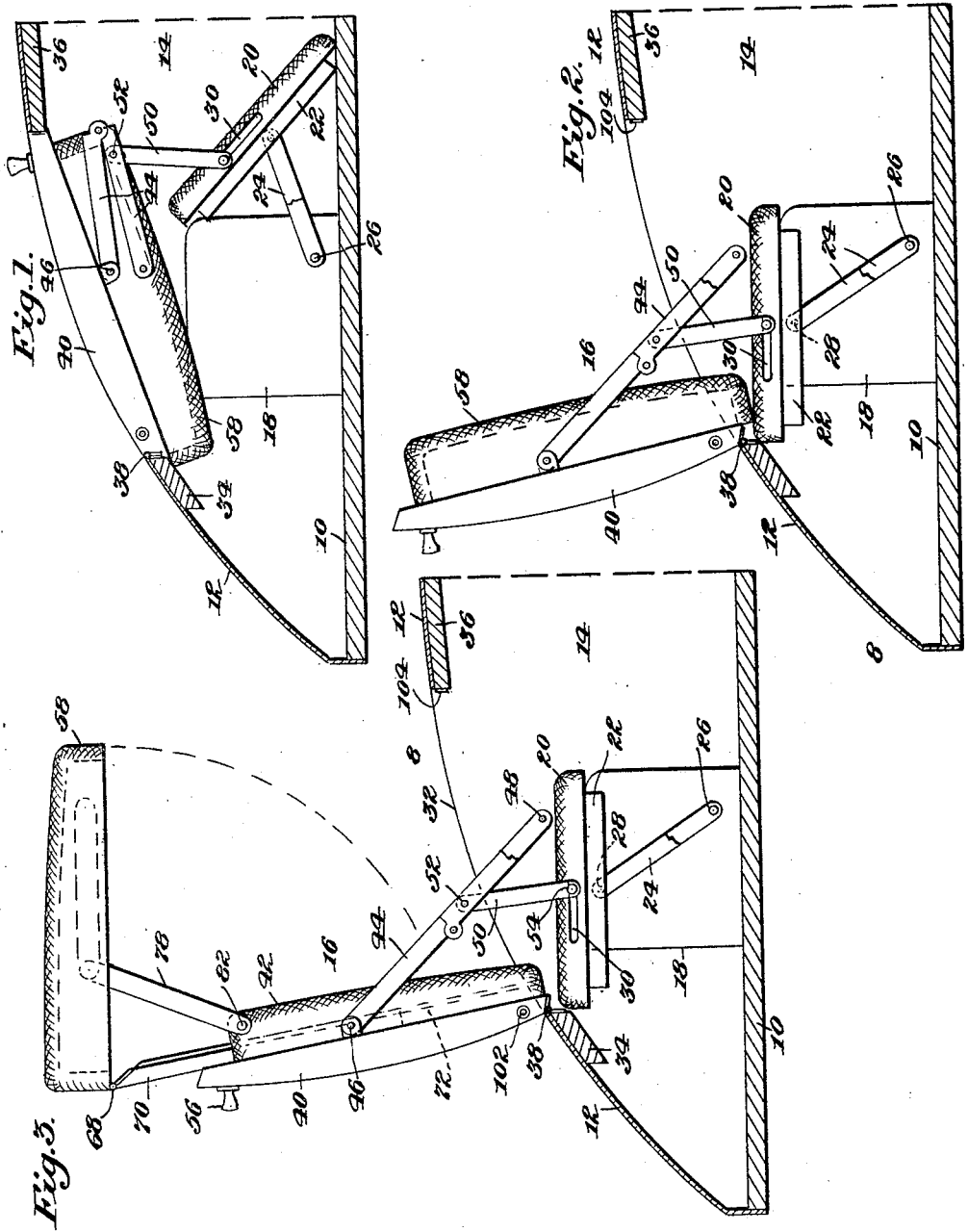
Inventor:
Morris Katzman,
Atty.

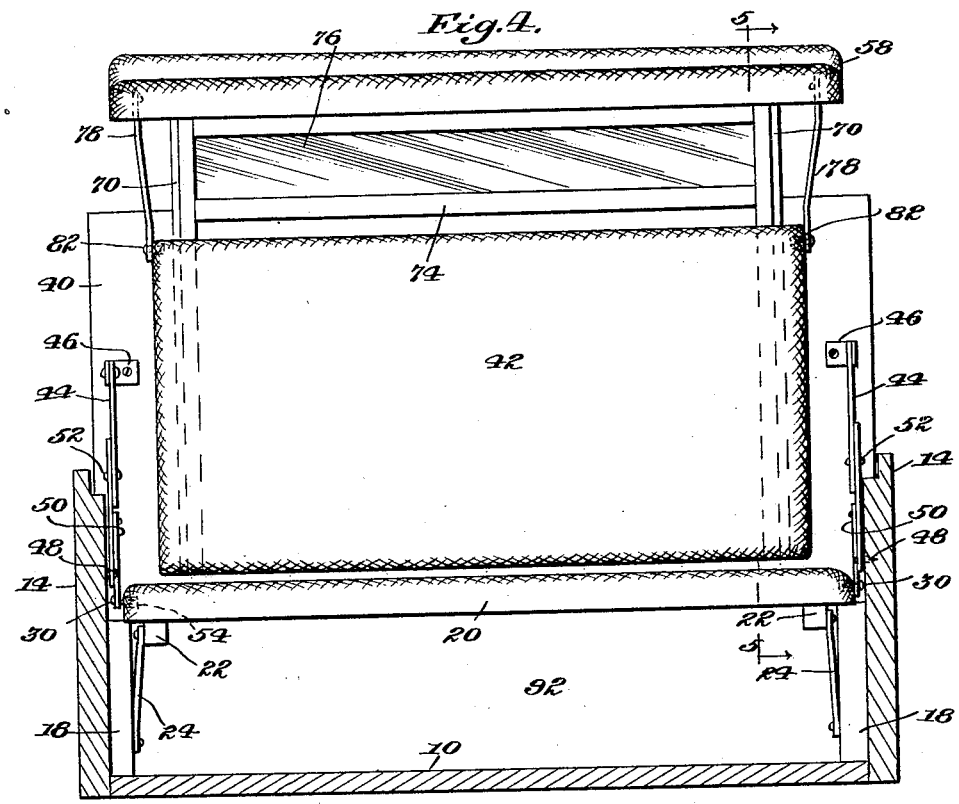

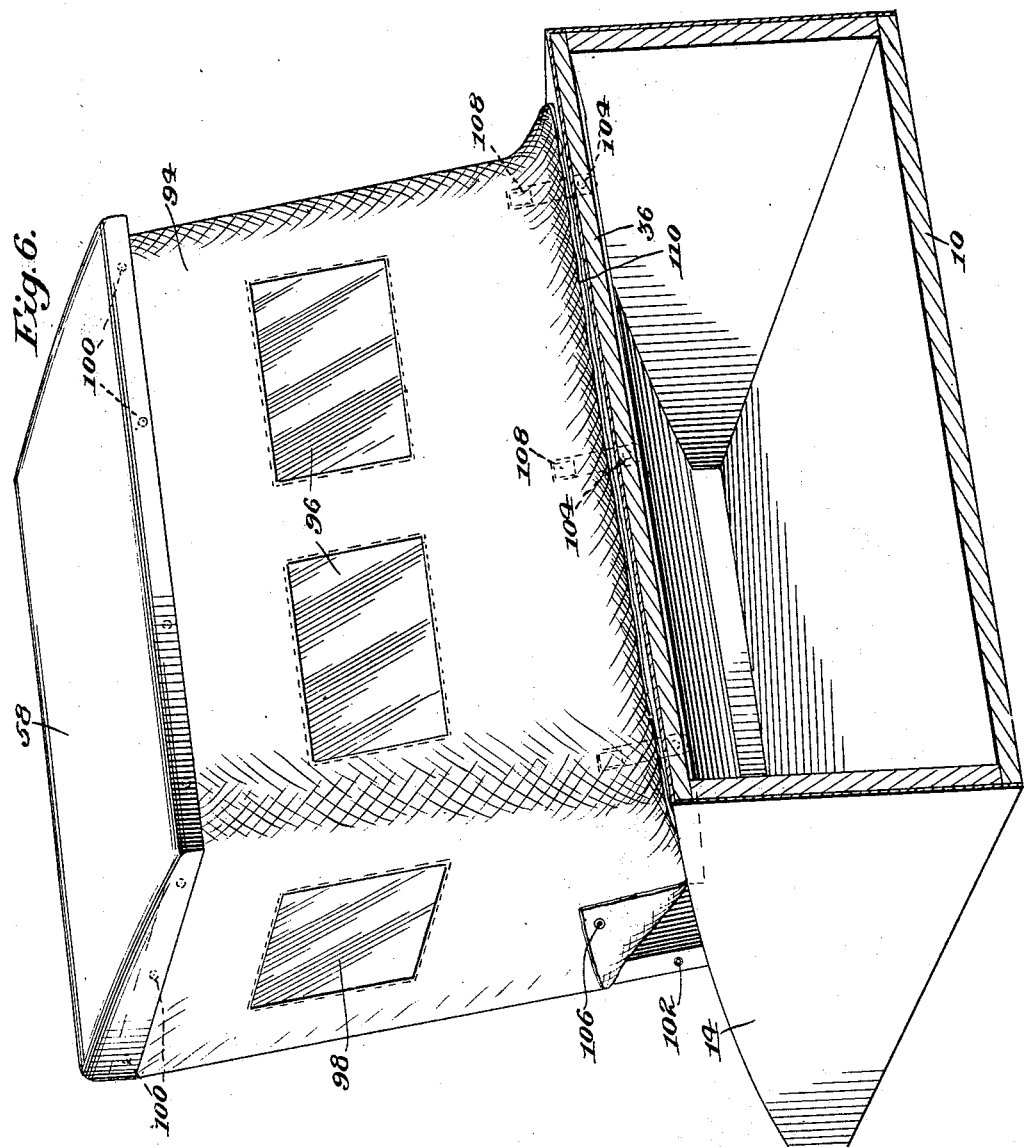

Patented Jan. 12, 1932

1,841,290

UNITED STATES PATENT OFFICE

MORRIS KATZMAN, OF EAST ORANGE, NEW JERSEY

VEHICLE SEAT AND TOP CONSTRUCTION

Application filed August 31, 1928. Serial No. 303,289.

This invention relates to vehicle bodies, and particularly to those types which are used on automobiles, such as roadster and coupé bodies, which have a rear compartment provided with an auxiliary or, as such is commonly called, a rumble seat which, when not in use, is collapsed and concealed in the rear compartment under the upper cover or deck.

The principal objects of the present invention are to equip a vehicle body with a seat which may be quickly and conveniently collapsed and concealed; which may be easily drawn from concealment into open, operative position; and which may readily be converted and arranged to protect the occupants from sun, wind, and rain.

More specifically, the objects of the invention are to provide a collapsible seat proper which is operatively connected to the seat back in such manner that movement of the latter to open and closed positions will automatically cause the seat proper to be set up or collapsed respectively; to provide a top which normally encases the back of the seat to form a part of the same and which may be quickly and conveniently adjusted to an open operative position; and to provide a single, continuous storm curtain which is adapted to be readily attached, (by the occupants and from the inside of the seat), to the seat and top construction after the top has been raised to operative position.

Other and further objects will become apparent from a study of the following description when taken in connection with the accompanying drawings. The latter are only illustrative of the invention and, for convenience and clarity of illustration, the seat construction has been shown, not in assembled relation upon a vehicle, but mounted in a unitary frame structure which obviously could be disposed within, or made a part of, a vehicle body.

In the drawings, in which like numerals indicate like parts throughout the several different views:—

Fig. 1 is a side elevation, with a part of the supporting framework removed, of the device in completely collapsed position.

Fig. 2 is a view similar to Fig. 1 but with the back of the seat and the seat proper thrown into normal, open position.

Fig. 3 is a showing similar to Fig. 2 but with the top removed from engagement with the back proper of the seat and disposed in raised, operative position.

Fig. 4 is a front elevation of the device in the position shown in Fig. 3.

Fig. 5 is a sectional view of the seat back and the top, taken on line 5—5 of Fig. 4, the seat proper and portions of the body having been removed.

Fig. 6 is a three-quarter perspective front view of the device with the top up and storm curtain attached.

As seen in the drawings a framework or compartment 8, consisting of a floor or lower deck 10, a cover or upper deck 12, and side walls 14 is arranged to receive an auxiliary seat 16 of the so called rumble type. Blocks 18, one at each side of the compartment, are provided for supporting a seat proper 20 when it rests in horizontal or operative position. Secured to seat 20 at the bottom thereof are a pair of longitudinal members 22 and a link 24 pivotally connects each member 22 with the block 18 of its corresponding side. As an aid to understanding the drawings it may be here stated that the left-hand members 14, 18, 22, and 24 of Fig. 4 have been removed in Figs. 1, 2, and 3.

It is apparent from the above that seat 20 may be oscillated about pivots 26 and 28 to assume either the horizontal position of Figs. 2, 3, and 4, or be collapsed as in Fig. 1. A longitudinal slot 30 is provided in each lateral edge of seat 20 for a purpose to be later described.

A hatchway 32 is cut in the upper deck 12 of the compartment, this hatchway being surrounded by side walls 14 and two rigid cross-members 34 and 36 (member 36 having been removed in Fig. 4 for the sake of clarity). Hinged at 38 and adapted to fit snugly (see Fig. 1) within the opening 32 is a hatch or cover 40. A back rest 42 is built upon the inside of cover 40. Folding brackets 44, one at each side of the seat, are pivotally secured at one end to the cover as at 46 and at their other ends to side walls 14 as at 48. Links 50 are pivotally attached at one end to brackets 44 as at 52 and at their other ends they are provided with pins 54 which project into slots 30 with a sliding fit. The folding brackets 44, links 50, slots 30 and links 24 are so related that, when cover 40 is opened and closed by means of handle 56, the seat proper 20 is automatically carried to its horizontal and collapsed positions respectively. This is readily apparent from an inspection of Fig. 1 to 3. As link 50 rises during the folding action of bracket 44, it lifts seat 20 in a positive manner, there being, however, some movement of pin 54 in slot 30 at the same time. At the end of the period of positive lifting action, the weight of the seat 20 and length of the slots 30 aid materially in causing the former to assume its respective final positions as seen in Figs. 1 and 2.

The collapsibility of seat 20 permits the use of a seat which is elevated above the floor to a greater height than is usual in rumble seat constructions, to afford greater leg room and comfort for the occupants. It also permits the use of a thicker, more comfortable back rest. The latter, in the present invention, is larger than usual, not only because of increased thickness, but also by the provision of a top which normally encases it.

The said top, indicated at 58, may consist of a rectangular frame formed from intersecting members 60 (see Fig. 5). This frame is of such shape as to snugly encase the back rest 42. It may be covered with a single sheet of weatherproof material or it may be built up as in Fig. 5, wherein a very thin, flexible metal sheet 62 is first placed upon the frame, followed by stuffing material 64 and an outer covering 66. The top frame is hinged as at 68 to two supporting uprights 70, the latter being shaped to slidably fit within channels or guideways 72 in the rear, lateral end portions of back rest 42. A cross-member 74 rigidly spaces the uprights and aids them in maintaining a glass 76 in position to form a rear window. An inwardly sprung link 78 is pivoted to the top frame as at 80 and, while it normally occupies the dotted line position of Fig. 3, when the top is raised it may be swung to the full line position and securely fastened to the back as at 82. The ends of the uprights and the adjacent portions of the rear frame member 60 are cut away as at 84 in order that the top may be folded from the open position of Figs. 3 and 5 through about 90° to that of Fig. 2. In the latter position the top forms a part of the back rest and actually conceals the back rest proper, 42, so well that its use as a false back cannot be readily detected.

It is obvious from an inspection of Figs. 1 to 4 that, to raise the top, one merely grasps its lower edge to oscillate it about hinges 68 sufficiently to clear the back 42, then hoists the uprights to the position shown in Fig. 2, and thereafter swings the top upwardly until the inwardly flexed links 78 can be adjusted to the full line positions. The cycle of operations is, of course, reversed when lowering the top to its normal position as in Fig. 2. Any equivalent means might be substituted for links 78 and any type of stop member (not shown) may, if desired, be provided to limit the upward movement of members 70.

The actual back rest 42 is, as previously stated, adapted to receive the uprights 70, cross-member 74, and glass 76 when the top is lowered. Its framework includes lateral upright members 86 which are grooved as at 72, and upper horizontal member 88 which is recessed intermediate its ends to permit passage of cross-member 74, and a lower horizontal cross-piece 90.

Storm curtains, accessories, and the like may be kept in the spacious chamber 92 beneath the seat.

A very effective storm curtain is provided for use in inclement weather. It consists of one continuous strip 94 of weatherproof material which is adapted to extend around both sides and the front of the rumble seat, when the top is up, and to be attached in position from the inside of the seat by the occupants. Front windows are disposed within the curtain in such manner that the driver of the vehicle may have a clear and unrestricted vision to the rear through these windows and glass 76. Additional windows 98 may be provided. Conventional snap fasteners 100 (see Fig. 5) are spaced in a row along the inner faces of top frame members 60. A snap fastener 102 is mounted (one on each side) near the lower corner of the hatch cover 40, and still further fasteners 104 are disposed on the vertical inner edge of body frame member 36 (see Fig. 3). There are of course, members spaced on the inner edges of the curtain for cooperating with the snap members 100, 102, and 104, for example, as indicated at 106 on the turned back portion of the curtain in Fig. 6. Straps 108 whose upper ends are sewed or otherwise secured to the inner front face of the curtain and whose lower ends are freely suspended and carry members like 106 for engaging the members 104, are provided for holding down the lower front edge 110 of the curtain. It is apparent that this type of curtain is adapted to be put on from the inside of the seat.

I wish it to be understood that the drawings are only illustrative of my invention, and that various changes in the details of construction and combination and arrangement of parts may be made, such changes to be limited only by the scope of the appended claims.

Having described my invention, I now claim:

1. In a rumble seat construction, a compartment having lower and upper decks, and a hatchway in said upper deck, a hatch hinged to the compartment for opening and closing said hatchway, a back rest formed upon the interior side of said hatch and a seat mounted to cooperate with said back rest, a recess in the back rest, a pair of top-supporting uprights slidably fitted for vertical movement within said recess and forming a space therebetween for a window, a top pivotally mounted on the upper ends of the uprights, and means for holding the top in an operative, substantially horizontal position, said top being adapted, upon downward oscillation thereof and lowering of the uprights, to encase the back rest to form a false back for the rumble seat, the seat proper being pivotally mounted in order that it may be moved to permit closing of the hatch, and means operable by the movement of said hatch for automatically causing pivotal movement of said seat proper.

2. In a rumble seat, a pair of pivoted links, a seat pivotally carried by said links, means for supporting said seat in operative position, a pivoted back rest, links pivoted to said back rest, links pivoted to fixed points, said second and third named links being pivotally connected, and links pivoted to said third named link and slidably and pivotally connected to said seat member.

3. In a vehicle seat construction, a back rest having a recess therein, uprights slidably supported in said recess for vertical movement, a top pivotally carried by said uprights, and means for holding the same in an operative, substantially horizontal, position, said top being adapted upon downward oscillation thereof and lowering of the uprights, to encase the back rest to conceal the same and form a false back.

4. In a vehicle seat construction, a back rest having a recess therein, uprights providing a space therebetween for a window and slidably supported in said recess for vertical movement, a top pivotally carried by said uprights, links pivoted to said top and pivotally connected to said back rest, said links being adapted to fold into the interior of said top, said top being adapted upon downward oscillation thereof and lowering of the uprights to encase the back rest to conceal the same and form a false back.

5. In a rumble seat construction, a compartment having lower and upper decks and a hatchway in the upper deck, a hatch hinged to the compartment for opening and closing said hatchway, a back rest formed upon the interior side of said hatch and having a recess therein, uprights slidably mounted in said recess for vertical movement, a top pivoted to said uprights, said top being adapted upon downward oscillation thereof and lowering of the uprights to encase the back rest and conceal the same, uprights in said compartment, links pivoted to said second uprights, a seat pivotally carried by said links and adapted to rest on said second uprights when in operative position, links pivoted to said back rest, links pivoted to fixed points, said second and third links being pivotally connected and links pivoted to said third links and having a pivoted sliding connection with said seat, whereby movement of said hatch automatically causes pivotal movement of said seat.

In testimony whereof, I have hereunto set my signature.

MORRIS KATZMAN.